(12) United States Patent
Tun et al.

(10) Patent No.: US 11,843,844 B2
(45) Date of Patent: Dec. 12, 2023

(54) IMAGE CAPTURING MODULE AND FOOD PROCESSING APPARATUS COMPRISING THE SAME

(71) Applicant: JIYONSON CO., LTD., New Taipei (TW)

(72) Inventors: Yun-Long Tun, New Taipei (TW); San-Chi Ho, New Taipei (TW); Ping-Hung Chen, New Taipei (TW)

(73) Assignee: JIYONSON CO., LTD., New Taipei (TW)

( * ) Notice: Subject to any disclaimer, the term of this patent is extended or adjusted under 35 U.S.C. 154(b) by 0 days.

(21) Appl. No.: 17/233,470

(22) Filed: Apr. 17, 2021

(65) Prior Publication Data

US 2021/0337089 A1 Oct. 28, 2021

(30) Foreign Application Priority Data

Apr. 27, 2020 (TW) .................................. 109114045

(51) Int. Cl.
*H04N 23/51* (2023.01)
*G03B 17/55* (2021.01)
*H04N 23/55* (2023.01)

(52) U.S. Cl.
CPC ............. *H04N 23/51* (2023.01); *G03B 17/55* (2013.01); *H04N 23/55* (2023.01)

(58) Field of Classification Search
CPC .................................................. H04N 5/2252
(Continued)

(56) References Cited

U.S. PATENT DOCUMENTS

| 4,315,133 A | * | 2/1982 | Morgan | ............. | B23K 26/1438 |
| | | | | | 219/121.84 |
| 2017/0000292 A1 | * | 1/2017 | Park | .................... | G03B 15/03 |

(Continued)

FOREIGN PATENT DOCUMENTS

| CN | 201903740 U | 7/2011 |
| EP | 3205941 A1 | 8/2017 |

(Continued)

OTHER PUBLICATIONS

The extended European Search Report rendered by the European Patent Office for European Patent Application No. 21169405.4, dated Sep. 6, 2021, 6 pages.

(Continued)

*Primary Examiner* — Joel W Fosselman
(74) *Attorney, Agent, or Firm* — Skaar Ulbrich Macari, P.A.

(57) ABSTRACT

A food processing apparatus is provided that includes: a housing structure, a food container structure which is disposed in the housing structure, and an image capturing module, which is located on the food container structure and includes a shell, an image capturing assembly and an air curtain assembly. The shell includes an optical channel which includes a lower opening end, an upper opening end and a wall surface disposed between the lower opening end and the upper opening end. The lower opening end faces the food container structure, the image capturing assembly is disposed at the upper opening end, and the air curtain assembly is disposed on the wall surface. In this way, the air curtain assembly can blow away or block the oil fumes after the food is heated, so that the image capturing module can observe the food processing clearly without being affected by the oil fumes.

11 Claims, 7 Drawing Sheets

(58) Field of Classification Search
USPC .......................................................... 348/373
See application file for complete search history.

(56) References Cited

U.S. PATENT DOCUMENTS

2017/0303348 A1    10/2017  Kondo et al.
2019/0310470 A1*   10/2019  Weindorf .................. B60S 1/56

FOREIGN PATENT DOCUMENTS

| JP | H0983845   A  | 3/1997  |
|----|---------------|---------|
| TW | I646904    B  | 1/2019  |
| WO | 2010080016 A1 | 7/2010  |
| WO | 2019208528 A1 | 10/2019 |

OTHER PUBLICATIONS

Office Action to the corresponding Chinese Patent Application rendered by the China National Intellectual Property Administration (CNIPA) dated Nov. 3, 2022, 19 pages (including English translation).

* cited by examiner

IMAGE CAPTURING MODULE AND FOOD PROCESSING APPARATUS COMPRISING THE SAME

PRIORITY

This application claims priority to Taiwan Patent Application No. 109114045 filed on Apr. 27, 2020, the disclosure of which is incorporated by reference herein in its entirety.

FIELD

The present invention relates to an image capturing module and a food processing apparatus comprises the same, and more particularly to an image capturing module being able to avoid the effects of oil fumes and a food processing apparatus using said image capturing module to observe and record the images of the food intended to be roasted or heated.

BACKGROUND

As time progresses, there are more and more consumers use varies food processing apparatuses such as coffee roaster, air fryer, microwave and the like to perform processes for example heating up food and the like. Taking coffee roaster (bean roaster) for example, beans (coffee beans or Job's tears) will be constantly stirred and heated to an appropriate state. Besides using the preset program of the coffee roaster to automatically complete the roasting process, users can observe the look (colors), smell, crackling and the like of the beans, and then control the roasting process of the beans.

To this end, an image capturing device is disposed inside the food processing apparatuses to capture the image of the appearance of the food during processing, and then the image is shown on a display for users to observe. However, while the food is being heated, oil fumes (or steam) are often generated, and excessive oil fume will certainly cause the image capturing device unable to capture the appearance of the food clearly.

Accordingly, there are several problems to be solved in the related art of food processing apparatus for warming up food.

SUMMARY

An objective herein is to provide a food processing apparatus, allowing its image capturing device to be less affected by oil fumes and steam, and thus can capture the food image clearly.

For the above purpose, the disclosure includes a food processing apparatus comprising: a housing structure; a food container structure disposed inside the housing structure; and an image capturing module located above the food container structure and comprising a shell, an image capturing assembly and an air curtain assembly, wherein the shell comprises an optical channel having a lower opening end, an upper opening end and a wall surface disposed between the lower opening end and the upper opening end. The lower opening end faces the food container structure, the image capturing assembly is disposed at the upper opening end, and the air curtain assembly is disposed on the wall surface.

In an example embodiment, the air curtain assembly comprises a fan and an air channel. The air channel comprises an outer opening end and an inner opening end, and the fan is disposed at the inner opening end or between the inner opening end and the outer opening end, wherein, the inner opening end is disposed on the wall surface, and the outer opening end is disposed on an outer side surface or an inner side surface of the shell.

In an example embodiment, the air curtain assembly further comprises a filter, disposed on the outer opening end.

In an example embodiment, the air curtain assembly comprises a fan, a first air channel and a second air channel. The first air channel and the second air channel each comprises an outer opening end and an inner opening end. The fan is disposed at the inner opening end of the first air channel or between the inner opening end and the outer opening end; wherein, the inner opening end of the first air channel is disposed on the wall surface, while the inner opening end of the second air channel is disposed on the wall surface and faces the inner opening end of the first air channel; wherein, the outer opening end of the first air channel and the outer opening end of the second air channel are both disposed on an outer side surface of the shell.

In an example embodiment, the air curtain assembly further comprises at least one filter, disposed at the outer opening end of the first air channel and/or at the outer opening end of the second air channel.

In an example embodiment, the image capturing module further comprises an image capturing device and a protective lens, disposed under the image capturing device.

In an example embodiment, the image capturing module further comprises at least one light-emitting device, disposed adjacent to the lower opening end of the optical channel and facing the food container structure.

In an example embodiment, the image capturing module further comprises at least one light-emitting device, disposed inside the housing structure and facing the food container structure.

In an example embodiment, the image capturing module at least partially disposed inside the housing structure, or disposed on the housing structure.

In an example embodiment, the optical channel is a truncated cone channel, the lower opening end is larger than the upper opening end.

Another objective is to provide an image capturing module, which can be detached from said food processing apparatus and be used independently.

For the above purpose, the disclosure includes an image capturing module comprising a shell, an image capturing assembly and an air curtain assembly, wherein, the shell comprises an optical channel having a lower opening end, an upper opening end and a wall surface disposed between the lower opening end and the upper opening end. The image capturing assembly is disposed at the upper opening end, and the air curtain assembly is disposed on the wall surface.

To make the above purposes, technical features and advantages clearer and easier to understand, the preferred embodiments with the reference drawings will be described in detail hereinafter.

DETAILED DESCRIPTION

The particular embodiments of the present invention are described in detail hereinafter. Nevertheless, without departing from the spirit of the present invention, there are varies ways to implement the embodiments. The scope of protection for the present invention should not be limited within the contents of the specification.

Unless clearly specified in context, an expression used in a singular "a/an" also includes the expression in its plural form, and the stated position (such as upper, lower, inner, outer, etc.) is a relative position and may be defined according to the using state of the food processing apparatus. The above terms are not used to indicate or imply that the food processing apparatus needs a structure, operations or manufactures with specific directions and thus should not be understood as limitations of the present invention.

Figure 1:
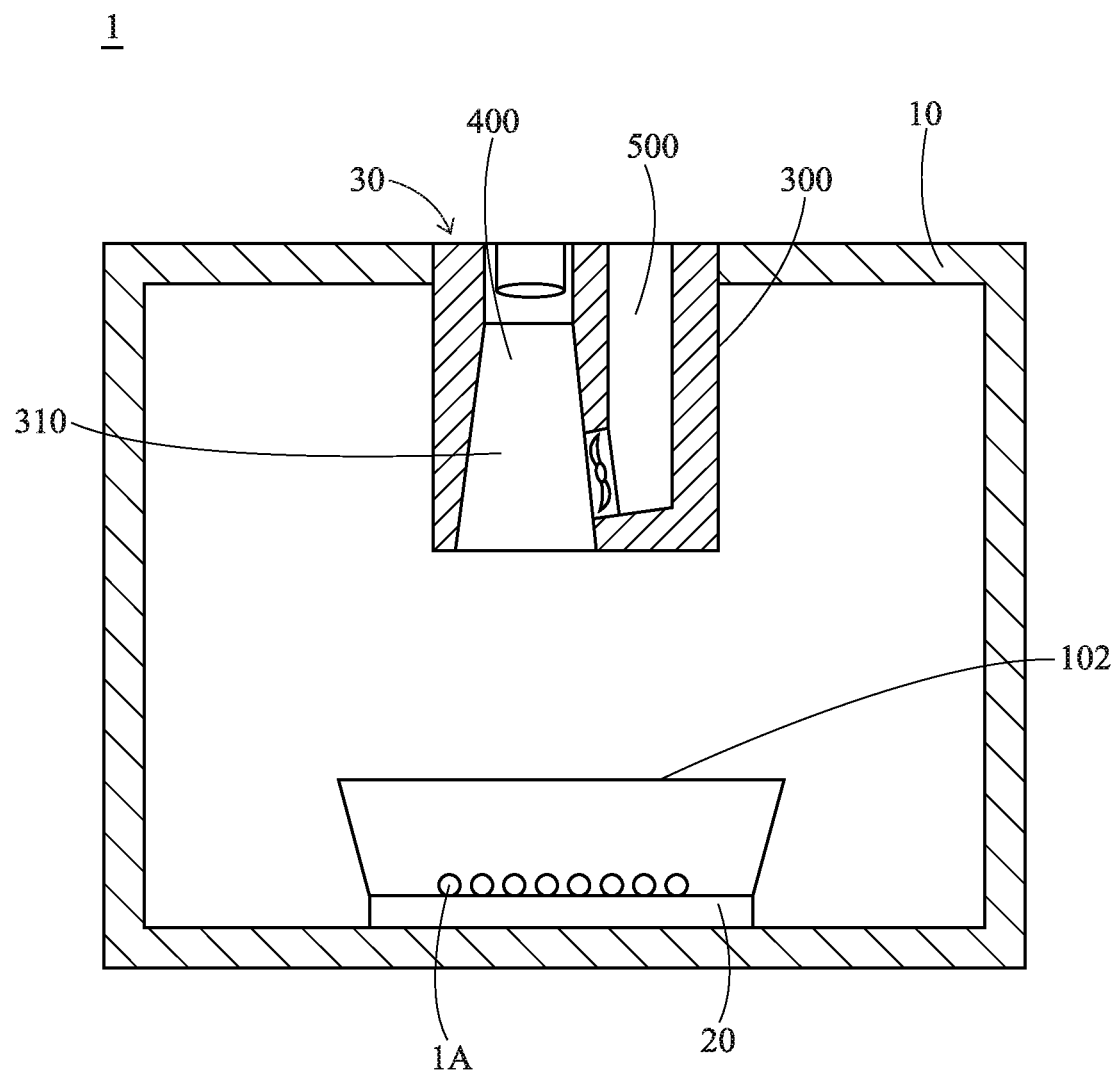
FIG. 1 is a schematic view showing the structure of the food processing apparatus according to a preferred embodiment of the present invention.
Figure 2:
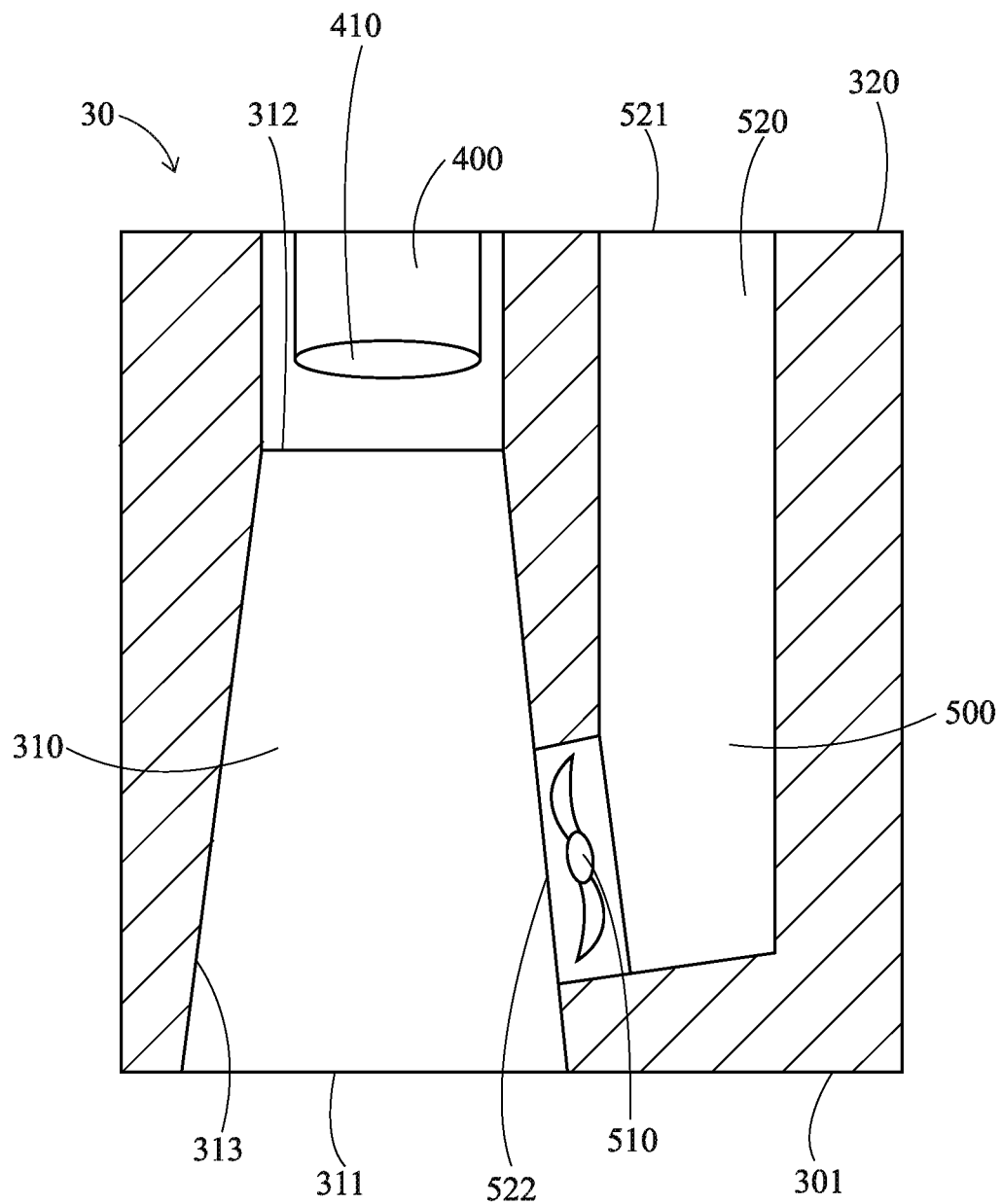
FIG. 2 and FIG. 3 are schematic views showing the structure of the image capturing module of the food processing apparatus illustrated in FIG. 1.

FIG. 1 and FIG. 2 are sectional schematic views showing a food processing apparatus 1 of the first preferred embodiment according to the subject invention. The food processing apparatus 1 mainly comprises a housing structure 10, a food container structure 20 and an image capturing module 30, and it may also comprise other elements such as blending barrel, heater rotating blade and the like (not shown) according to the type of the food processing apparatus. The food container structure 20 and the image capturing module 30 may be disposed inside the housing structure 10. Taking coffee roaster as an example to further describe the technical features of the housing structure 10, the food container structure 20 and the image capturing module 30 hereinafter. The disclosure of Taiwan Patent Application No. 106126572 can also be referred to but shall not be limited thereto so that the technical features can also comprise other embodiments or be implemented by other ways. Accordingly, the entire contents of Taiwan Patent Application No. 106126572 are incorporated herein by reference.

The housing structure 10 presents an appearance of a cuboid but is not limited to such a shape. The housing structure 10 has a containing space for receiving the food container structure 20 and the image capturing module 30 and other related elements. The food container structure 20 may contain food 1A, such as coffee beans or bread during baking, and may be connected to other processing elements, such as a stirring barrel (not shown). The food 1A is not kept in the food container 20 the whole time, but may be moved into the stirring barrel to be heated, and then moved back to the food container 20. In other embodiments (not shown), the food 1A may also be directly performed the process of heating and the like in the food container 20 without stirring.

The image capturing module 30 is at least partially disposed inside the housing structure 10, that is, the image capturing module 30 may partially protrude outside of the housing structure 10. In this embodiment, the image capturing module 30 is completely disposed inside the housing structure 10 (no parts protrude outside of the housing structure 10). The image capturing module 30 located above the food container structure 20, and an observation opening 102, that is, an upper opening, of the food container structure 20 may be open or transparent to allow the image capturing module 30 to observe and capture the images of food 1A in the food container structure 20.

More specifically, the image capturing module 30 comprises a shell 300, an image capturing assembly 400 and an air curtain assembly 500, wherein, the shell 300 may be an appearance of a cuboid, but not limited to such a shape, the image capturing assembly 400, the air curtain assembly 500 and the like may be contained within the shell 300. The shell 300 is at least partially disposed inside the housing structure 10, and comprises an optical channel 310 which can be a hollow channel and extends upward from a bottom surface 301 of the shell 300. The optical channel 310 may comprise a lower opening end 311, an upper opening end 312 and a wall surface 313 disposed between the lower opening end 311 and the upper opening end 312. The lower opening end 311 faces the food container structure 20, that is, facing the observation opening 102 of the food container structure 20, and preferably, there are no elements or structures that block the light between the lower opening end 311 and the observation opening 102.

The image capturing assembly 400 is disposed at the upper opening end 312, and may be partially located in the optical channel 310, at the upper opening end 312, or above the upper opening end 312. The air curtain assembly 500 is disposed upon the wall surface 313, that is, disposed between the lower opening end 311 and upper opening end 312 (below the image capturing assembly 400), to create an air curtain (airflow) in the optical channel 310. Preferably, the air curtain assembly 500 does not protrude into the optical channel 310 to avoid affecting the image capturing of the image capturing assembly 400.

In this way, the oil fumes produced by heating up the food 1A and flow into the optical channel 310 can be effectively blocked or eliminated by the air curtain created by the air curtain assembly 500 so as to ensure that the oil fumes will be unable to contact with the image capturing assembly 400 and will not stay in the optical channel 310. Therefore, the lens, protective lens and the like of the image capturing assembly 400 will not be contaminated by the oil fumes. The image capturing assembly 400 can capture the image of the food 1A clearly if there is no oil fume in the optical channel 310.

Next, the air curtain assembly 500 will be further described. The air curtain assembly 500 can be implemented as anything that can generate airflow to block oil fumes. In this embodiment, the air curtain assembly 500 may comprise a fan 510 and an air channel 520 having an outer opening end 521 and an inner opening end 522. The fan 510 is disposed at the inner opening end 522 or between the inner opening end 522 and the outer opening end 521. The inner opening end 522 is disposed on the wall surface 313, and the outer opening end 521 is disposed at an outer side surface 320 such as a top surface or a side surface of the shell 300. In this way, the fan 510 runs to suck the air from the outer opening end 521 into the air channel 520, and then blow the air out from the inner opening end 522 into the optical channel 310; thereafter, the air along the wall surface 313 of the optical channel 310 is blown out from the lower opening end 311, and the oil fumes are blown out at the same time.

Figure 3:
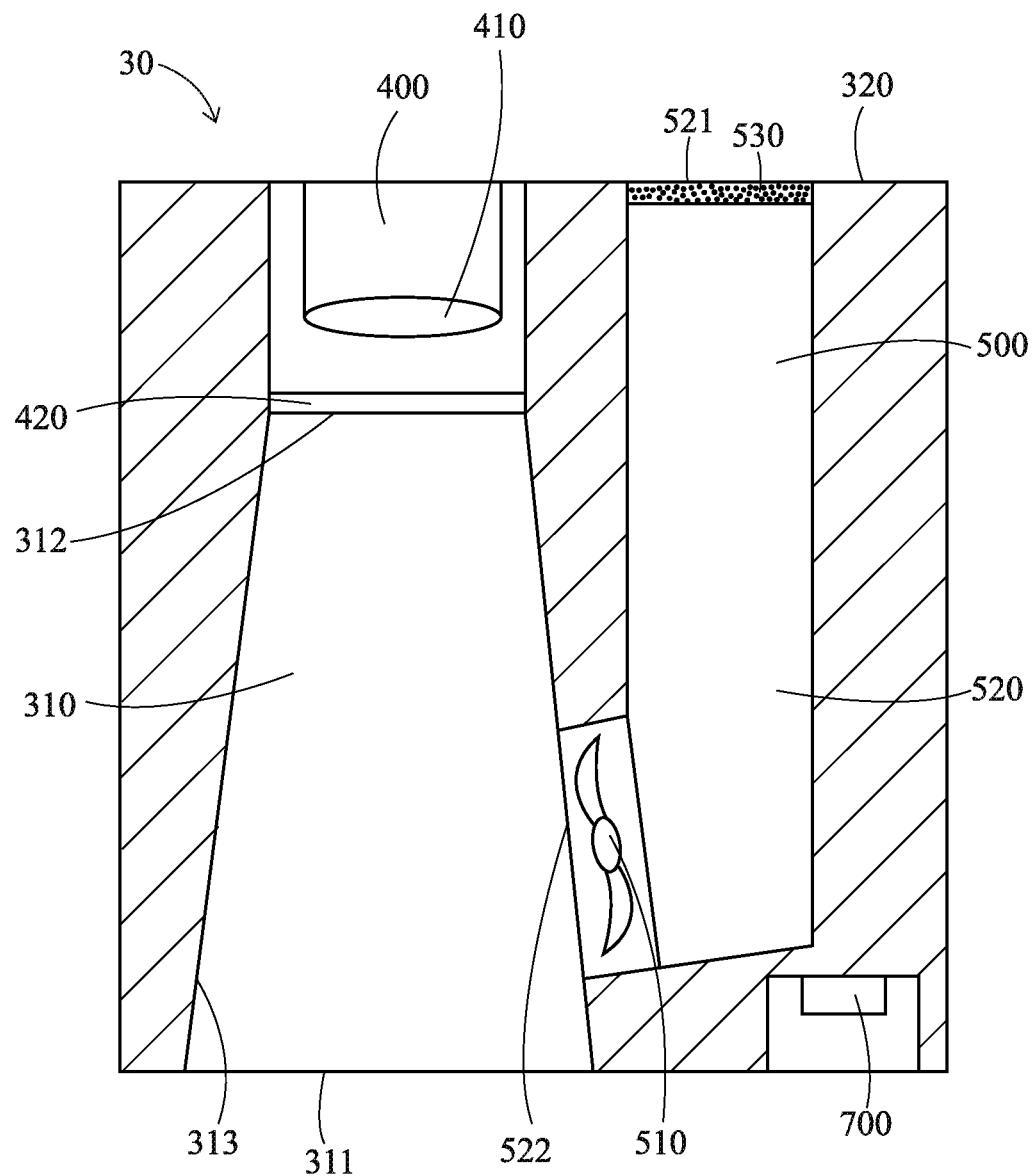

As shown in FIG. 3, preferably, the air curtain assembly 500 further comprises a filter 530 disposed at the outer opening end 521. The filter 530 can not only prevent dust in the air from being sucked into the food processing apparatus 1 and cause the fan 510 and the image capturing assembly 400 to accumulate dust, but also prevent dust from being scattered on the food 1A in the food containing structure 20. If the fan 510 is operated as an air extraction means, the filter 530 can also filter the oil fume from the heated food to prevent the oil fumes from diffusing to the interior space.

Furthermore, preferably, the image capturing module 30 comprises an image capturing device 410 and a protective lens 420. The protective lens 420 is disposed under the image capturing device 410 to ensure that the image capturing device 410 will not be contacted by the oil fumes or dust which are not successfully blocked, and may also avoid damage of the image capturing device 410 due to any collision. In addition, the image capturing module 30 preferably comprises a light-emitting device 700 which is disposed adjacent to the lower opening end 311 of the optical channel 310 and faces the food container structure 20. In this way, when the brightness in the housing structure 10 is insufficient, the light-emitting device 700 may emit light toward the food containing structure 20 so that the image capturing device 410 may capture the image of the food 1A clearly.

Furthermore, the optical channel 310 of the image capturing module 30 may be a truncated cone-shaped channel, and the lower opening end 311 is larger than the upper opening end 312, so that the image capturing device 410 can capture a wider range of images.

Figure 4:
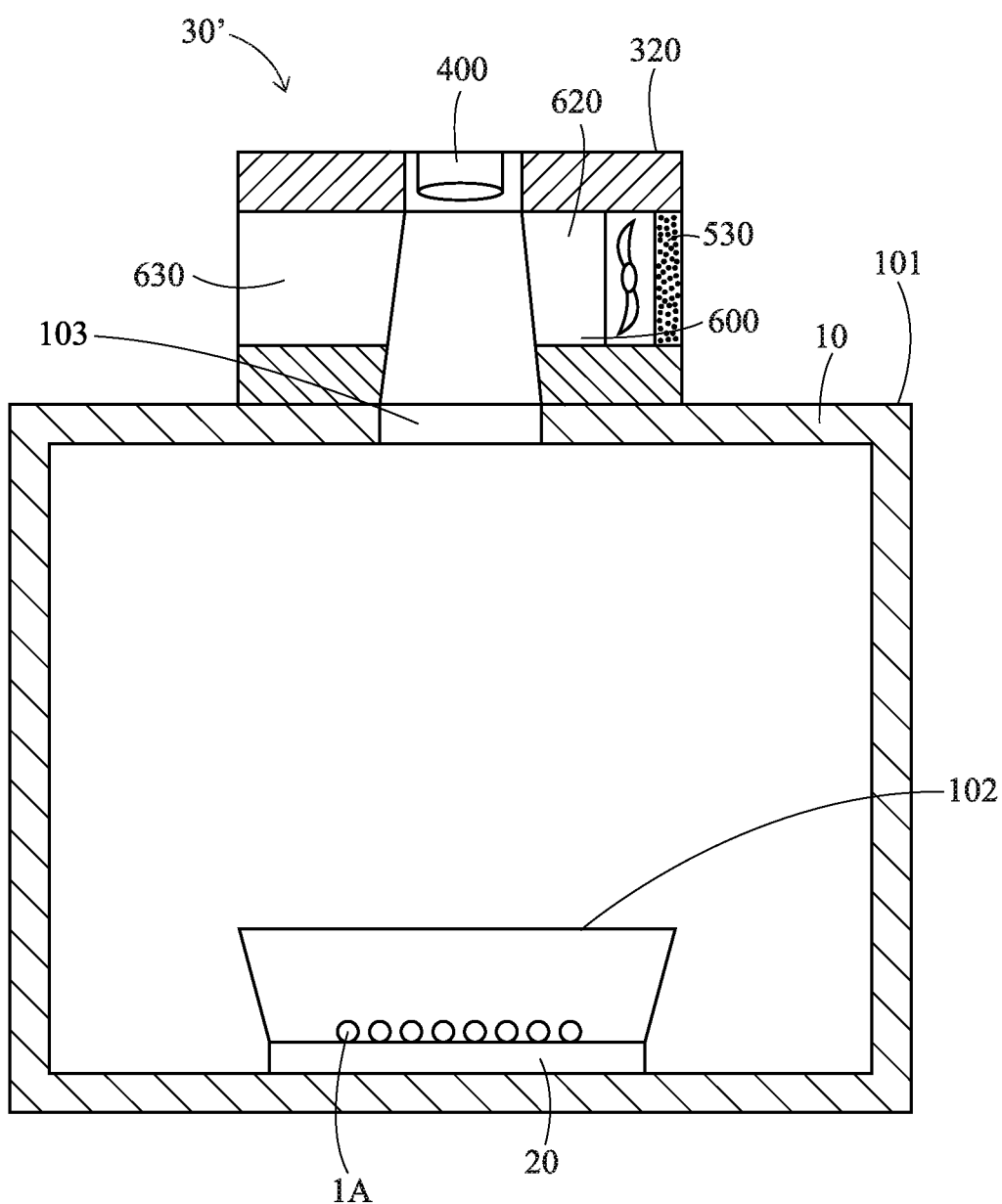
FIG. 4 is a schematic view showing the structure of the food processing apparatus according to a further preferred embodiment of the present invention.
Figure 5:
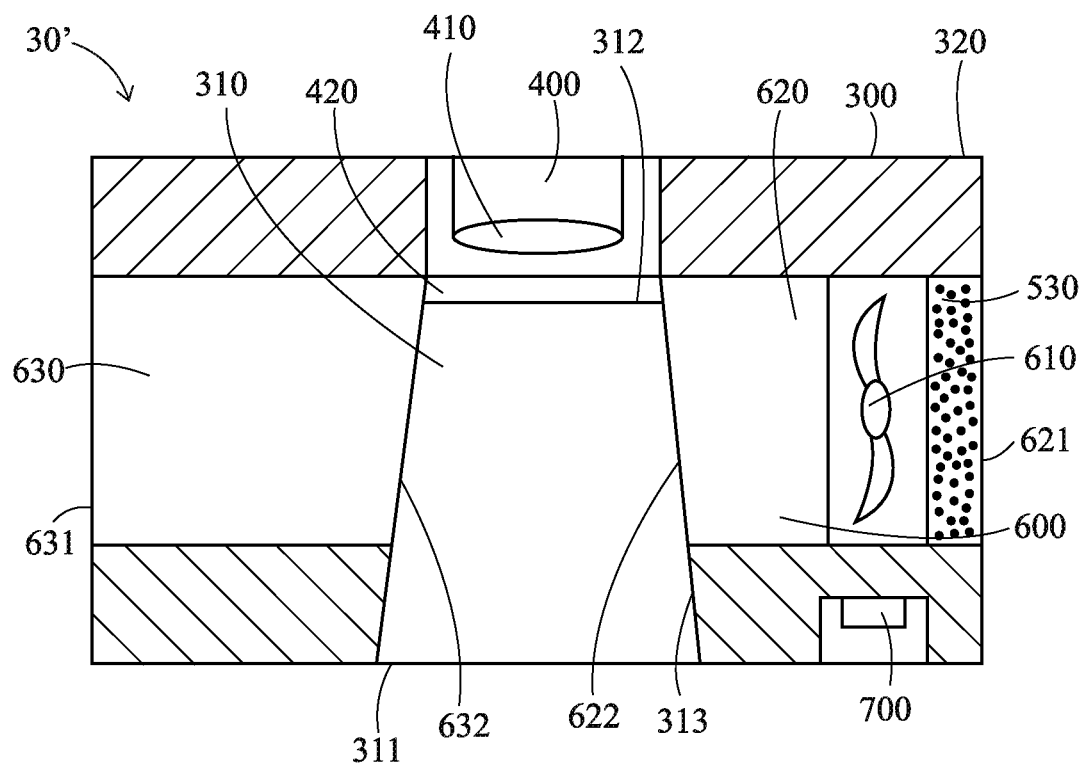
FIG. 5 is a schematic view showing the structure of the image capturing module of the food processing apparatus illustrated in FIG. 4.

FIG. 4 and FIG. 5 are the schematic views disclosing the structures of the food processing apparatus 2 and the image capturing module 30' according to the second preferred embodiment of the present invention. The difference between the food processing apparatuses 1 and 2 is that the image capturing module 30' can be disposed on the housing structure 10, that is, on the top surface 101 of the housing structure 10. The top surface 101 of the housing structure 10 comprises a transparent observation opening 103 to allow the image capturing module 30' to capture images of food 2A in the food containing structure 20 through the observation opening 103. The observation opening 103 is open to allow fluid connection between the inner space from the optical channel 310 to the housing structure 10 through the observation opening 103. Therefore, oil fumes inside the housing structure 10 may go into the optical channel 310 though the observation opening 103.

Furthermore, the air curtain assembly 600 of the image capturing module 30' comprises a fan 610, a first air channel 620 and a second air channel 630. The first air channel 620 and the second air channel 630 each comprises an outer opening end 621, 631 and an inner opening end 622, 632. The fan 610 is disposed at the inner opening end 622 of the first air channel 620 or between the inner opening end 622 and the outer opening end 621; wherein, the inner opening end 622 of the first air channel 620 is disposed on the wall surface 313, and the inner opening end 632 of the second air channel 630 is disposed on the wall surface 313 and faces the inner opening end 622 of the first air channel 620; wherein both the outer opening end 621 of the first air channel 620 and the outer opening end 631 of the second air channel 630 are disposed on an outer side surface 320 of the shell 300.

In this way, when the fan 610 is operated, the fresh air will be sucked from the outer opening end 621 and be blown into the optical channel 310 from the inner opening end 622. Meanwhile, the oil fumes produced by the heated food 2A will be blown into the inner opening end 632 with the fresh air, and then be exhausted from the outer opening end 631 through the second air channel 630. The image capturing module 30' may also provide a second fan (not shown) in the second air channel 630 to improve the efficiency of air exhausting. Additionally, the air curtain assembly 600 further comprises at least a filter 530 disposed at the outer opening end 621 of the first air channel 620 and/or the outer opening end 631 of the second air channel 630.

The image capturing module 30' may comprise an air curtain assembly 500 in the first embodiment instead of the air curtain assembly 600. Similarly, the image capturing module 30 may also comprise the air curtain assembly 600 in the second embodiment instead of the air curtain assembly 500.

Figure 6:
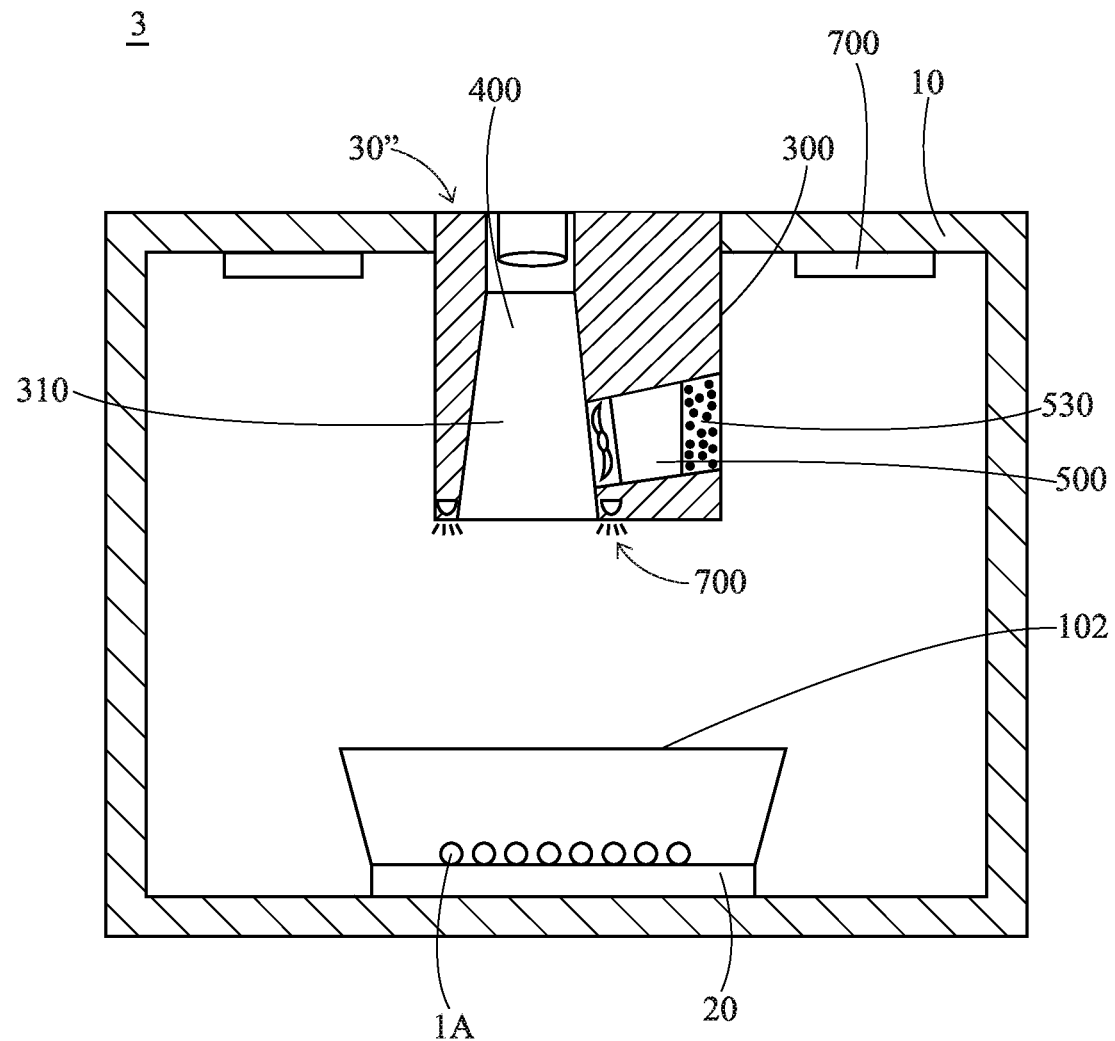
FIG. 6 is a schematic view showing the structure of the food processing apparatus according to a further preferred embodiment of the present invention.
Figure 7:
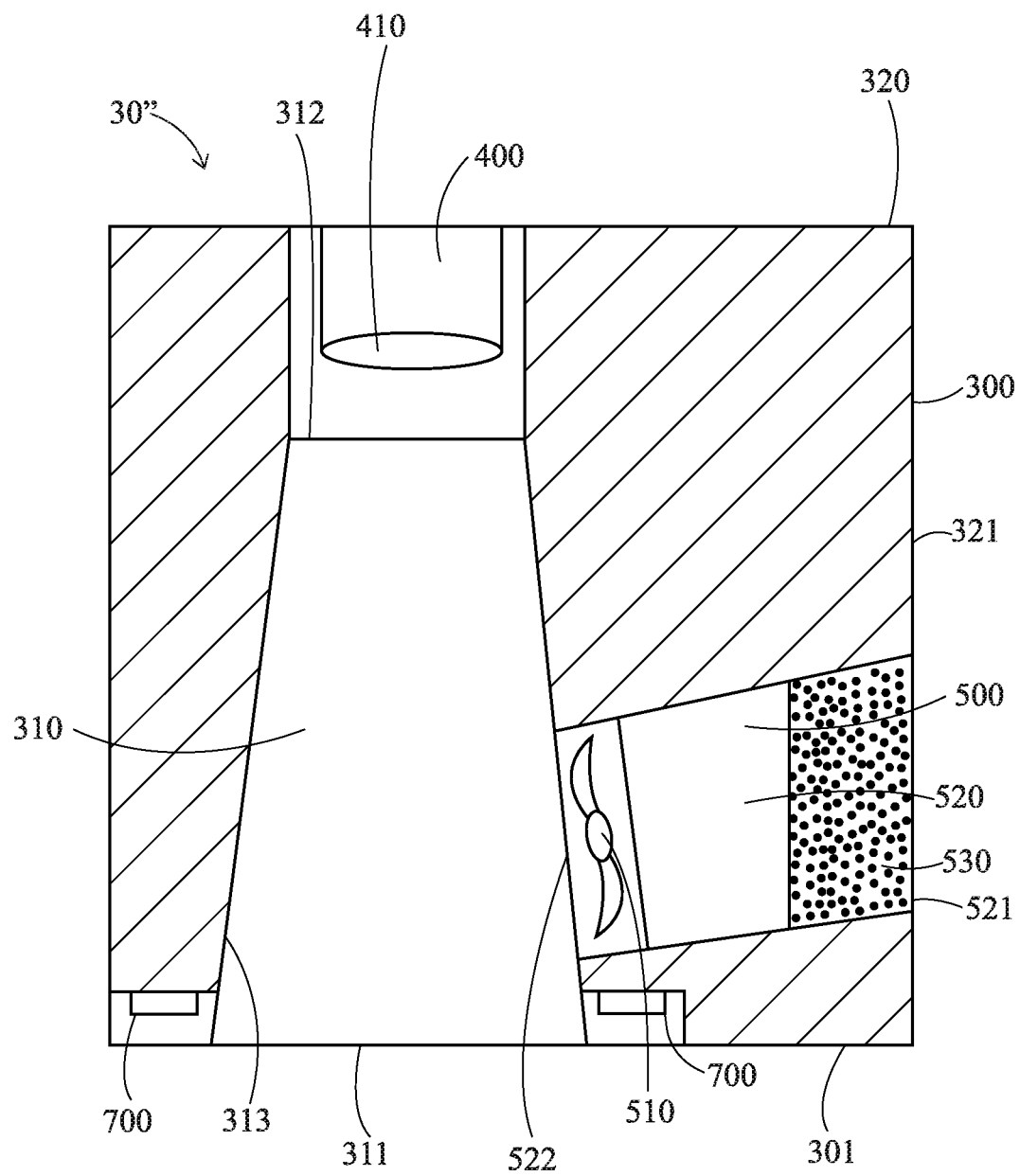
FIG. 7 is a schematic view showing the structure of the image capturing module of the food processing apparatus illustrated in FIG. 6.

FIG. 6 and FIG. 7 are schematic views showing the structures of the food processing apparatus 3 and the image capturing module 30" according to the third preferred embodiment of the present invention. The difference between the food processing apparatus 1 and the food processing apparatus 3 is that the filter 530 and the outer opening end 521 are disposed on an inner side surface 321 of the shell 300.

In particularly, the inner side surface 321 of the shell 300 is located inside the housing structure 10. Therefore, when the fan 510 of the air curtain assembly 500 starts to run, the oil fumes produced by the food 1A will circulate inside the food processing apparatus 3 through the air channel 520. To prevent affecting the capturing of the image capturing assembly 400 when the oil fumes are being sucked in from the outer opening end 521, the filter 530 disposed on the inner side surface 321 of the shell 300 may absorb the greasy oil of the oil fumes to make the image capturing assembly 400 able to capture the images of the food 1A clearly.

In addition, the light-emitting device 700 of the food processing apparatus 3 may be disposed at different locations, as shown in FIG. 6, a plurality of light-emitting devices 700 can be disposed on the inner upper part of the housing structure 10, thereby completely illuminating the inside of the food processing device 3. Alternatively, as shown in FIG. 7, the plurality of light-emitting devices 700 may also be disposed next to the lower opening end 311 of the optical channel 310 of the image capturing module 30" (surrounding the lower opening end 311). The light-emitting devices 700 surrounding the lower opening end 311 may facilitate the light to focus on the location of the food 1A and thus are helpful in recording and capturing the images by the image capturing assembly 400.

Accordingly, the image capturing module of the food processing apparatus according to the present invention comprises an air curtain assembly and is able to blow away or block the oil fumes produced by the heated food to allow the image capturing module to capture and/or record the images of food clearly without being affected by the oil fume. In addition to the food processing apparatus, the image capture module can also be used in other places with oil fume, smoke, and dust to capture images of objects. Moreover, the image capturing module may be detached from the food processing apparatus independently for cleaning or replacement.

The above embodiments are merely provided to describe the technical solutions of the present invention, but not limited thereto. It should be appreciated by persons skilled in this field that they may proceed with a variety of modifications based on the disclosures of the embodiments or evenly replace some or all of the technical features. Nevertheless, these modifications or replacements do not cause the essence of the corresponding technical solutions to deviate from the scope of the technical solutions of the embodiments of the present invention.

LIST OF REFERENCE NUMERALS

The following reference numerals are used to denote certain elements.
1, 2, 3: food processing apparatus
1A: food
10: housing structure
20: food container structure
30, 30', 30": image capturing module
101: top surface
102,103: observation opening
300: shell
301: bottom surface
310: optical channel
311: lower opening channel
312: upper opening channel
313: wall surface
320: outer side surface
321: inner side surface
400: image capturing assembly
410: image capturing device
420: protective lens
500,600: air curtain assembly
510,610: fan
520: air channel
521,621,631: outer opening end
522,622,632: inner opening end
530: filter
620: first air channel
630: second air channel
700: light-emitting device

What is claimed is:

1. A food processing apparatus, comprising:
a housing structure;
a food container structure, disposed in the housing structure; and
an image capturing module, located above the food container structure and comprising a shell, an image capture assembly and an air curtain assembly, wherein, the shell comprises an optical channel, and the optical channel has a lower opening end, an upper opening end and a wall surface disposed between the lower opening end and the upper opening end, wherein, the lower opening end faces the food container structure, the image capture assembly is disposed at the upper opening end, and the air curtain assembly is disposed on the wall surface and comprises a fan and at least an air channel including an outer opening end and an inner opening end, wherein:
the fan is disposed between the inner opening end and the outer opening end, and is preferably adjacent to the inner opening end;
the inner opening end is disposed on the wall surface;
the outer opening end is disposed on an outer side surface or at a top surface of the housing; and
the optical channel and the air channel share a wall that comprises the wall surface, and the optical channel and the air channel are separated by the wall.

2. The food processing apparatus of claim 1, wherein, the air curtain assembly further comprises a filter, disposed at the outer opening end.

3. The food processing apparatus of claim 1, wherein, the air channel comprises a first air channel and a second air channel, wherein, the first air channel and the second air channel each comprises an outer opening end and an inner opening end, the fan is disposed between the inner opening end and the outer opening end of the first air channel, the inner opening end of the first air channel is disposed on the wall surface, and the inner opening end of the second air channel is disposed on the wall surface and facing the inner opening end of the first air channel; wherein, each of the outer opening end of the first air channel and the outer opening end of the second air channel is disposed on an outer side surface of the housing.

4. The food processing apparatus of claim 3, wherein, the air curtain assembly further comprises at least one filter, disposed at the outer opening end of the first air channel and/or the outer opening end of the second air channel.

5. The food processing apparatus of claim 1, wherein, the image capturing module further comprises an image capturing device and a protective lens disposed below the image capturing device.

6. The food processing apparatus of claim 1, wherein, the image capturing module further comprises at least one light-emitting device disposed next to the lower opening end of the optical channel and facing the food container structure.

7. The food processing apparatus of claim 1, wherein, the image capturing module further comprises at least one light-emitting device disposed inside the housing structure and facing the food container structure.

8. The food processing apparatus of claim 1, wherein, the image capturing module is at least partially disposed inside the housing structure, or disposed on the housing structure.

9. The food processing apparatus of claim 1, wherein, the image capturing module is detachably assembled on the housing structure.

10. The food processing apparatus of claim 1, wherein, the optical channel is a truncated cone channel, the lower opening end is larger than the upper opening end.

11. An image capturing module, comprising a housing, an image capturing assembly and an air curtain assembly, wherein, the housing comprises an optical channel, and the optical channel has a lower opening end, an upper opening end and a wall surface disposed between the lower opening end and the upper opening end, wherein, the lower opening end faces the food container structure, the image capture assembly is disposed on the upper opening end, and the air curtain assembly is disposed upon the wall surface and comprises a fan and an air channel having an outer opening end and an inner opening end, wherein:
the fan is disposed between the inner opening end and the outer opening end, and is preferably adjacent to the inner opening end;
the inner opening end is disposed on the wall surface;
the outer opening end is disposed on an outer side surface of the housing or at a top surface of the housing; and
the optical channel and the air channel share a wall that comprises the wall surface, and the optical channel and the air channel are separated by the wall.

* * * * *